(12) United States Patent
Virbitsky et al.

(10) Patent No.: US 12,254,454 B2
(45) Date of Patent: Mar. 18, 2025

(54) ONE CLICK CANCEL

(71) Applicant: Capital One Services, LLC, McLean, VA (US)

(72) Inventors: Erik Virbitsky, Washington, DC (US); Keith A. Kates, Richmond, VA (US); Marisa Lee, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 178 days.

(21) Appl. No.: 18/051,705

(22) Filed: Nov. 1, 2022

(65) Prior Publication Data

US 2024/0144211 A1 May 2, 2024

(51) Int. Cl.
| | |
|---|---|
| G06Q 40/00 | (2023.01) |
| G06Q 20/10 | (2012.01) |
| G06Q 20/14 | (2012.01) |
| G06Q 20/40 | (2012.01) |

(52) U.S. Cl.
CPC .......... *G06Q 20/102* (2013.01); *G06Q 20/14* (2013.01); *G06Q 20/407* (2013.01)

(58) Field of Classification Search
CPC ...... G06Q 40/00; G06Q 20/102; G06Q 20/14; G06Q 20/407
See application file for complete search history.

(56) References Cited

U.S. PATENT DOCUMENTS

| | | | |
|---|---|---|---|
| 6,422,462 B1 | 7/2002 | Cohen | |
| 7,418,426 B1 | 8/2008 | Reunert et al. | |
| 8,571,985 B1 | 10/2013 | Grigg et al. | |
| 9,767,520 B2 | 9/2017 | Isaacson et al. | |
| 10,482,467 B1 * | 11/2019 | Samitt | G06Q 20/407 |
| 10,740,852 B1 | 8/2020 | George et al. | |
| 11,256,789 B2 | 2/2022 | Jones | |
| 11,284,143 B2 | 3/2022 | Thomas et al. | |
| 2004/0210449 A1 | 10/2004 | Breck et al. | |
| 2009/0070260 A1 | 3/2009 | Flitcroft et al. | |
| 2014/0019352 A1 | 1/2014 | Shrivastava | |
| 2018/0103086 A1 * | 4/2018 | Jones-McFadden | H04L 67/535 |
| 2021/0058657 A1 | 2/2021 | Bates et al. | |
| 2021/0406896 A1 * | 12/2021 | Chaturvedi | G06Q 20/405 |

(Continued)

FOREIGN PATENT DOCUMENTS

EA 8185 B1 * 4/2007

OTHER PUBLICATIONS

Regulating consumer financial products: Evidence from credit cards S Agarwal, S Chomsisengphet . . . — . . . Quarterly Journal of . . . , 2015—academic.oup.com (Year: 2015).*

*Primary Examiner* — Lalita M Hamilton
(74) *Attorney, Agent, or Firm* — Banner & Witcoff, Ltd.

(57) ABSTRACT

Aspects provided may allow for a user to block charges from an entity without having to contact the entity. After detecting that the user has enrolled in a trial or subscription of an entity offering, the user may be provided with the option to block charges from the entity. Using incoming data, charges from the blocked entity may be identified and prevented from being applied to the user. Further aspects may provide for more discrete charge blocking, such as blocking charges for one activity while allowing other charges for different activities from the same entity to go through, and training an identification model that isolates the entity identifier from the incoming data and matches the entity identifier to known entities.

20 Claims, 9 Drawing Sheets

(56) References Cited

U.S. PATENT DOCUMENTS

2022/0327539 A1* 10/2022 Piparsaniya .......... G06Q 20/14
2023/0131942 A1    4/2023 Thomas et al.

* cited by examiner

ONE CLICK CANCEL

FIELD

Aspects of the disclosure relate to computer implemented systems and methods for detecting an evaluation period, providing a user with the option to block charges after the evaluation period ends, identifying an entity based on the incoming data, and blocking further activity with the entity based on identification information in the incoming data.

BACKGROUND

People frequently sign up for trials of activities with entities. These trials, which are often free or reduced-price, are a major tool for both users and entities. For users, the trials represent an opportunity to try a new activity or service for free or reduced cost before signing up for the activity on a long-term basis. For entities, trials are a crucial chance to get a user attached to an activity, which makes the user more likely to continue with the activity after the trial ends.

This model may be especially common in the online streaming space, where most service providers offer free trials of a week or month to content of a streaming service. Due to the proliferation of streaming services, many users may wish to sign up for a trial period, watch one new show, and then cancel the service to save money. Other users may wish to suspend the subscription temporarily in between seasons of a show: again, for the purpose of efficiently using resources.

For most trials through online service providers, signing up for trial requires the user to provide information for an electronic account to be charged the full price at the end of the trial. For many users, this electronic payment method may be a credit or debit card under the user's name and offered via a financial institution.

Trials may be typically designed to auto-renew automatically; rather than the user being required to return to the service provider site to confirm continuation of the product or service. At the end of the trial, the service provider will charge the provided electronic payment method. This charge marks the beginning of the new period of access to the service or product. For ongoing subscriptions, the service provider will continue charging the electronic payment method at the beginning of every new period until the electronic payment method stops accepting charges or the user deactivates the service.

This payment configuration benefits service providers, as many users forget to deactivate the service, even if the user does not intend to use the product or service any further. This allows service providers to collect payments from users without the user getting the equivalent value from the service. Even if the user does remember to deactivate the service, the user may forget to do so until after the service provider has charged the provided electronic payment method the renewal fee for the service. In this case, the user has already paid for another period of a service that the user did not intend to use.

At the same time, deactivating services can be very difficult for users. It may be difficult to locate the deactivation forms on a website. It may require the user to call a customer service center, which may only be open during business hours, and force the user to take time out of work to cancel the service. The user may also deal with the service's attempts to re-negotiate payments to avoid losing a customer; viral stories of customers spending hours attempting to end Internet and cable services, for example, are common. In other cases, the service contract may require the user to pay cancellation fees or prevent the user from stopping payments immediately, instead requiring the user to finish paying for a minimum period of time before ending the service.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

For all of these reasons, users may benefit from access to the ability to prevent services from auto-charging the provided electronic payment method at the end of a trial period. Financial institutions, which provide the credit card and debit cards that most users use to sign up for trials with online service providers, also may likely benefit from being able to offer this ability. The ability to block charges from a specific service provider may provide the user more financial control, which may make the financial institution offering that ability a more attractive choice compared to other financial institutions without that ability.

BRIEF DESCRIPTION OF THE DRAWINGS

The present disclosure is illustrated by way of example and not limited to the accompanying figures in which like reference numerals indicate similar elements and in which.

DETAILED DESCRIPTION

Figure 1:
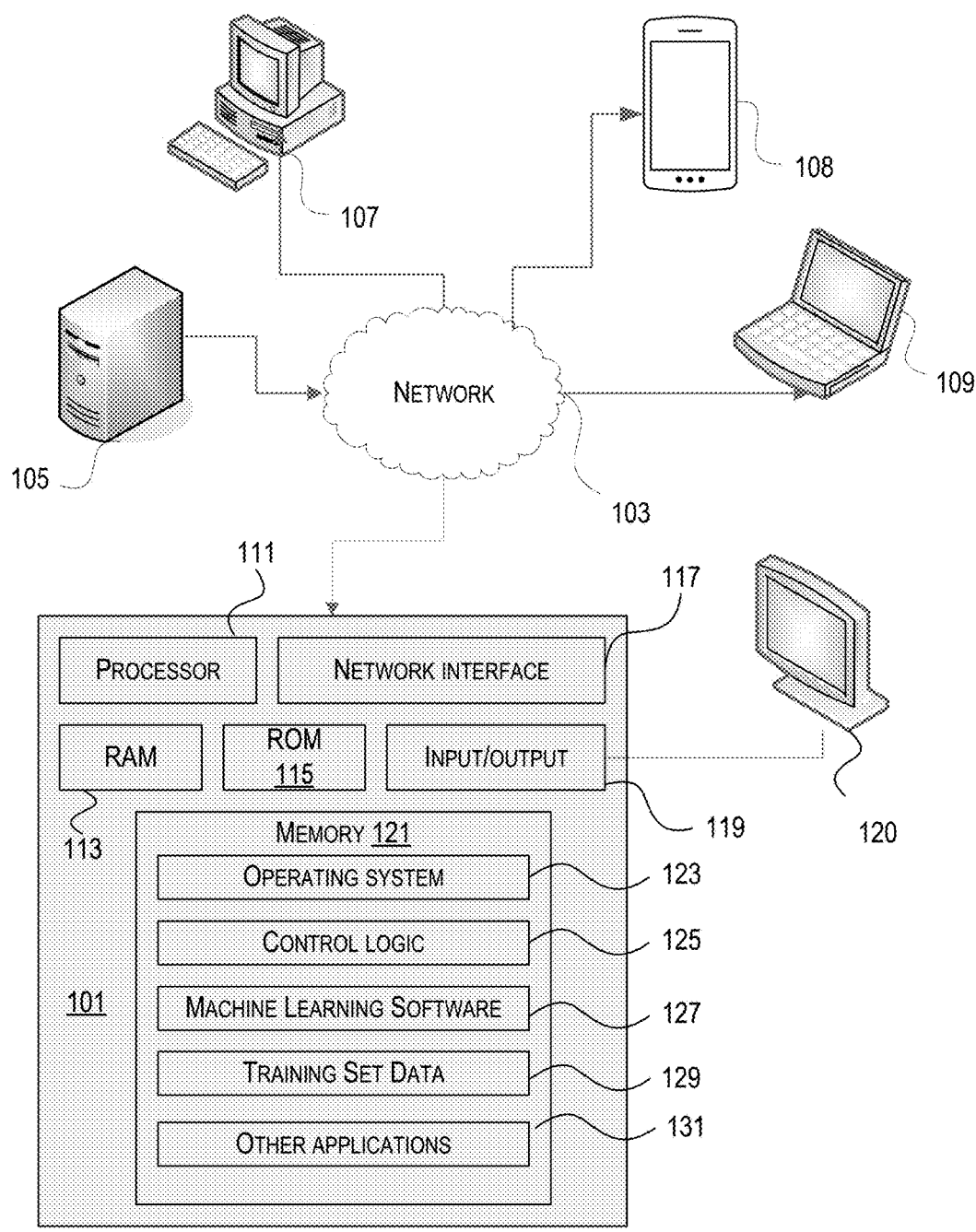
FIG. 1 depicts an example of a computing device that may be used in implementing one or more aspects of the disclosure in accordance with one or more illustrative aspects discussed herein.

In the following description of the various embodiments and aspects, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of illustration and should not be regarded as limiting. Rather, the phrases and terms used herein are to be given their broadest interpretation and meaning.

Many users may enroll in trials for service provider services or products, where the trial is free or at a reduced price for a trial period. These service provider services may include streaming media subscription services like HBO Max™, a food delivery service like HelloFresh™ a gym membership such as Anytime Fitness™, or any other services or benefits obtained by paying a recurring, regularly scheduled payment. Many of these trials may require that the user provide, online via a computing device, an electronic payment method (e.g., debit card, credit card, etc.) upon enrollment, where the service provider charges the electronic payment method automatically at the end of the trial period unless the user proactively contacts the service provider to cancel the service, by logging into their online account and managing their account. No computing mechanism is provided to avoid the user being automatically charged to continue the service for a recurring period (e.g., monthly) short of the user logging into their account. That is, the user may be automatically charged by the service provider without prompting the user, by the service provider or otherwise, to confirm they wish to continue with the service beyond the trial period. Some users, however, may not want to continue with the service after the trial period, and would benefit from being able to block charges to the electronic payment method for the service.

Financial institutions do not usually have access to the required pieces of information to provide the ability to block charges after trials. To be able to block charges to prevent the service from continuing after the trial, the financial institution may require two pieces of information: first, the date on which the trial ends; and second, the ability to identify which incoming charges are for the service associated with the trial. Users do not typically provide information about new trials to financial institutions, nor do service providers typically inform financial institutions that a user has signed up for a new trial using an electronic payment method maintained by that financial institution to. As a result, the financial institution needs to be able to detect that the user has signed up for a trial based only on the information the financial institution already receives, which is often limited to financial charges, deposits, pre-authorizations, and similar data.

Similarly, the financial institution may also need to detect which incoming charges to the electronic payment method are associated with the trial. While the financial institution may have access to all of the data in the incoming charge, these data are not identified in a uniform way. This may make it difficult to reliably and programmatically identify the service provider for any individual incoming charge.

To identify when a user has started a trial with a service provider, a computing device associated with the financial institution can track the preauthorization that the service provider generates for the user's electronic payment method after the user signs up for the trial according to the disclosure. The computing device may receive the preauthorization, then may process and apply it to the user's electronic payment method based on the account address contained in the preauthorization. The preauthorization also may contain service provider identifier information for the service provider; the computing device may clean this identifier information and compare it to a list of known service providers that offer trials. In this way, the computing device associated with the financial institution may determine that the user has begun a trial and the identity of the service provider offering the trial.

The computing device associated with the financial institution may then cause a notification to be sent to the user regarding the trial and provide the user with the option to block future charges to that service provider. If the user decides to block charges, the computing device then may receive the notice from the user and mark a record associated with the service provider as blocked for that electronic payment method.

When an incoming charge is addressed to the user's electronic payment method and received by the financial institution for processing and routing, the computing device associated with the financial institution may use the service provider identification model, built via machine learning, to extract the identity of the service provider from the charge. The financial institution may then compare the service provider from the charge to the service providers that are blocked for that electronic payment method. If the service provider from the incoming charge matches a service provider on the blocked list, the financial institution may prevent that charge from being applied to the user's electronic payment method. The financial institution may also block future and continued charges from the service provider, as many service providers may attempt to re-issue the same charge if the charge was unsuccessful or declined. The scheme described herein may provide the user with the ability to block a charge by streamlining the process, using fewer computing resources and without requiring the user to login into the service provider account to manage their account.

Aspects discussed herein may relate to methods and techniques for detecting that a user has begun a trial for a service offered by a service provider, providing the user with the option to block charges from that service provider, identifying the service provider based on the information within the incoming charge data, and blocking charges from the service provider at request of the user.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smartphone, any other types of mobile computing devices, and the like), and/or any other type of data processing device.

Computing device 101 may, in some embodiments, operate in a standalone environment. In other embodiments, computing device 101 may operate in a networked environment. As shown in FIG. 1, various network nodes 101, 105, 107, 108, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 108, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces (I/O) 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 108, 109 may have similar or different architecture as described with respect to computing device 101. Those of skill in the art will appreciate that the functionality of computing device 101 (or device 105, 107, 108, 109) as described herein may be spread across multiple data processing devices, for example, to distribute processing load across multiple computers, to segregate transactions based on geographic location, user access level, quality of service (QoS), etc. For example, devices 101, 105, 107, 108, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that may be subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
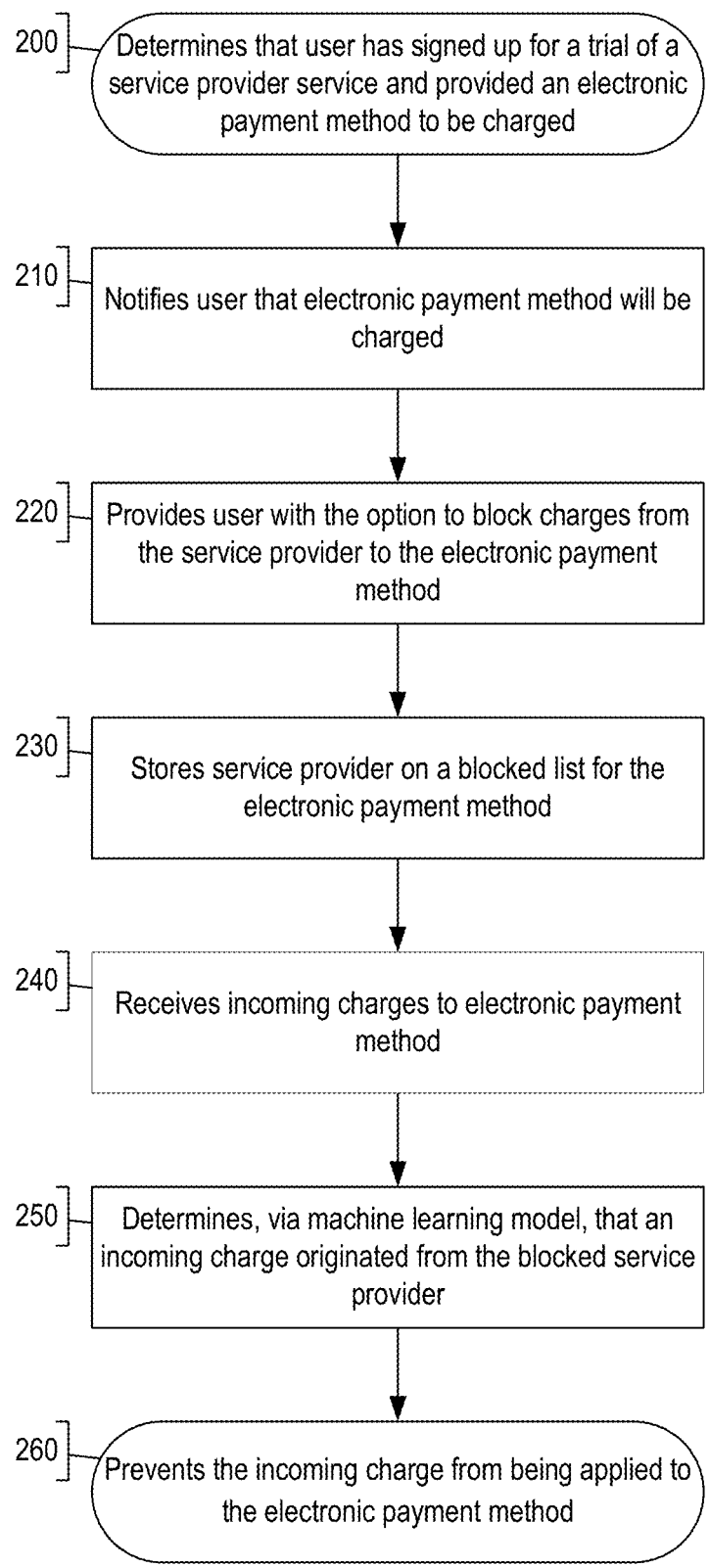
FIG. 2 is an illustrative flowchart representation of the process of blocking charges according to aspects of the disclosure.

FIG. 2 depicts an example of the method flow for determining that the user has enrolled in a trial, providing the user with the option to block charges to the service provider, identifying the service provider for incoming charges, and blocking charges for the blocked service provider. FIG. 2 provides a high-level representation of embodiments for this process. These steps are broken down further in FIGS. 3 and 6.

In step 200, the financial institution may determine that the user has signed up for a trial for a service provider service and provided an electronic payment method, which may be maintained by the financial institution, to be charged. The electronic payment method may be a credit or debit card maintained by a bank. However, disclosed embodiments may employ other electronic payment methods, including, but not limited to, virtual card numbers (VCNs), mobile wallets, cryptocurrency, prepaid accounts, third-party payment processors such as PayPal, and more. Similarly, while the financial institutions may be a bank, they are not limited to such entities and may include, but are not limited to, third-party payment processors, cryptocurrencies, cryptocurrency wallet applications, and any other entities that can receive and process a charge to a user account.

These electronic payment methods may be maintained on a distributed network, similar to network 103, and on computing devices similar to computing devices 101 and 105. Electronic payment methods may be accessed by users from a user-accessed computing device, such as computing devices 101, 105, 107, 108, 109, and over a network similar to network 103.

Embodiments for how the institution determines that the user has entered into a trial may vary. In some examples, this step may include the financial institution receiving a preauthorization, over network 103 to a distributed system operated by the financial institution, from the service provider to the electronic payment method before charging the electronic payment method. These examples will be discussed further in FIG. 3.

Other examples for detecting the trial period may include determining that the user has not been charged by that service provider before or recently, indicating that the user is eligible for a trial, maintaining lists of service providers that are common sources of trials and sending notifications based on a first charge or preauthorization for those service providers, and more. These lists may be stored on databases similar to computing device 101 and 105 and accessed via network 103 when necessary. The user or service provider may also notify the financial institution directly that the user has begun a trial. In such examples, the user or service provider may use a computing device 101 to send the notification to the financial institution, which may receive the notification over network 103 and process the notification on one or more computing devices similar to computing devices 101, 105, 107, and 109.

Optionally, the financial institution may also notify the user that a trial has been detected on the electronic payment method. This may be embodied in an email, mobile notification, text, phone call, or any other common method of contact. For electronic notifications, the notification may be received by the user on a user-accessed device similar to computing devices 101, 107, 108, or 109. The financial institution may also optionally prompt the user to block charges for the service provider at this time; the mechanics of this step will be discussed further in step 220.

In step 210, the financial institution may generate a notification from an internal server, such as computing device 105, and may send the notification over network 103 to the user that the electronic payment method will be charged in advance of the end of the trial period. This notification may be embodied in an email, mobile notification, text, phone call, or any other common method of contact. For electronic notifications, the notification may be received by the user on a user-accessed device similar to computing devices 101, 107, 108, or 109. In some aspects, the user may receive the notification on a mobile device operated by the user, similar to computing device 108, and via an application provided by the financial institution for the purpose of granting mobile access for users to manage financial accounts.

Optionally, this notification may be triggered by confirmation from the user after the financial institution detected a new trial, notified the user, and confirmed that the user may like a reminder sent before the end of the trial period. Determination of when to notify the user may be embodied in different ways. In some aspects, the financial institution may calculate the length of the trial period based on prior pre-authorizations and payment cycles for other users paying for the same or similar services from the same service provider. Other aspects for determining the length of the trial may include, but are not limited to, scraping information about trial lengths from websites associated with the service provider, the user providing a date for the financial institution to send the user a reminder, or from the service provider providing information about trial lengths to the financial institution. It will be appreciated that a model may be developed via machine learning to evaluate information associated with a particular service provider and previous trials by service provider (with other users) as well as information scraped from websites to determine the most likely duration of the trial, which may be stored in a database as a data set for that service provider, which can be trained based on whether the predicted trial length was ultimately correct.

It will be appreciated that the financial institution may not be able to confirm the length of the trial period until the service provider charges the electronic payment method or the charge is received via a payment processor. It will be appreciated that the moment the charge is received by the electronic payment method, the financial institution may not immediately apply the electronic payment method. It is not uncommon for such charges to show up as being pending earlier than the scheduled date or at an early time on the scheduled date (e.g., 9 am). Prior to applying the charge, the financial institution can provide the user with an option to block charges from the service provider based on the electronic payment method scheduled to be charged and prior to the end of the trial.

In step 220, the financial institution may provide the user with the option to block future charges from the service provider to the electronic payment method. In some aspects, the financial institution may send one notification to the user, where the notification contains both the message that the electronic payment method will be charged and the prompt to block charges from the service provider. In other aspects, the prompt for containing the option to block charges may be delivered at a different time during the trial. This notification may be embodied in an email, mobile notification, text, phone call, or any other common method of contact.

If the user decides to block charges, the financial institution may record the service provider to a blocked list associated with the electronic payment method in step 230. In certain aspects, the financial institution may record this via a server, similar to the server 105 in FIG. 1, which receives the user decision to block the service provider via message generated by user device 108 and sent over network 103. The server 105 may then record the service provider on a blocked list for the electronic payment method, where the blocked list may refer to the data organization for storing which service providers are blocked for which electronic payment methods or users. The blocked list may be stored on a database like computing device 101 or 105. In the database, the blocked list may be stored in memory 121 or in RAM 113, depending on the needs of the financial institution. A local record of the service provider blocked list may also be stored on the user device 108, again either in standard memory 121 or RAM 113.

In some aspects, the blocked list may associate the service provider with the electronic payment method. In other aspects, the blocked list may associate the service provider with the user account, to block all future charges from the service provider to any electronic payment methods associated with the user and maintained by the same financial institution. In other aspects, where the service provider offers multiple services or products for one-time payments, the blocked list may associate only the identifier for the service the user wishes to block charges for. For example, Amazon not only offers the flagship subscription Amazon Prime™, but also offers multiple different subscriptions for cable TV networks; HBO Max™, ParamountPlus™, Starz™ etc. In these aspects, a user may block charges for HBO Max™ on Amazon™, but still allow charges from Amazon™ itself or for Amazon Prime™.

In step 240, the financial institution may receive all incoming charges to the electronic payment method. These charges may be received in real time and the incoming charge data processed through a model to identify the service provider that originally sent the charge. In the most common aspects, these charges may be structured according to ISO 8583, the international standard for financial transaction card messages. In other aspects, the charges may be structured according to the data standard used by the electronic payment method.

In step 250, the financial institution may determine that the service provider, as identified via the service provider identification model and compared to known service provider identifiers, is the blocked service provider for the electronic payment method. This step will be discussed further herein with respect to FIG. 6.

The financial institution then may prevent the incoming charge from being applied to the electronic payment method in step 260. In some aspects, the financial institution may save the blocked charge with a code to internally identify the charge as blocked. In other aspects, the financial institution may send a response to the service provider indicating that the electronic payment method was declined. In some aspects, the service provider may re-send the charge based on receiving a response indicating that the electronic payment method was declined or a failure to receive the payment for the charge. In these aspects, the financial institution may block these additional charges as well.

Optionally, the financial institution may notify the user that an incoming charge from the service provider was blocked. The user may receive this notification on a user device similar to computing device 108, or on other computing devices that can access a network similar to network 103 and receive communications. In certain aspects, this notification may inform the user that the financial institution will continue to block charges from the service provider. In other aspects, the notification may remind the user to cancel the account with the service provider to prevent further attempted charges. In still further aspects, the notification may provide the user with the option to allow future charges from the service provider and remove the service provider from the blocked list.

If the service provider is not on the blocked list for the electronic payment method, the financial institution may allow the charge to be applied to the electronic payment method.

Figure 3:
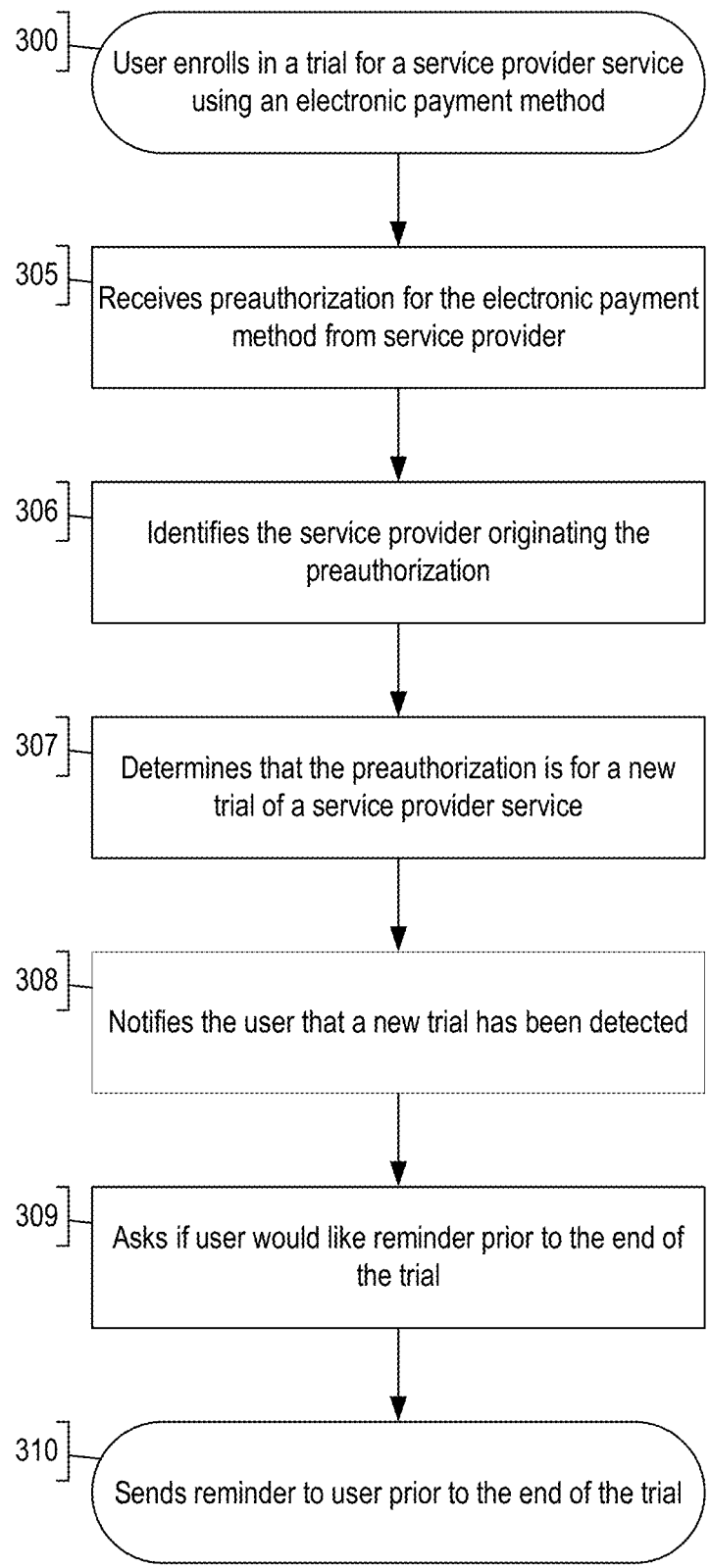
FIG. 3 is an illustrative flowchart representation showing the detailed steps for determining that the user has entered into a trial, identifying the service provider providing the trial, then providing the user with the ability to block future charges from the service provider according to aspects of the disclosure.

FIG. 3 depicts an illustrative flowchart representation of embodiments by which the financial institution may determine that the user has signed up for a trial at a service provider. In step 300, similar to step 200, the user may enroll in a trial for a service provider service using an electronic payment method maintained by the financial institution.

In step 305, the financial institution may receive a preauthorization sent by the service provider for the service for which the user may be enrolled in a trial. The preauthorization may be sent by the service provider to confirm that the electronic payment method exists and has funds available to pay for the service. In some aspects, where the electronic payment method may be a credit card, debit card, or VCN, the preauthorization may be an ISO 8583 0100 authorization message from the service provider to the electronic payment method. In other aspects, the preauthorization may be structured according to the data standard used by the electronic payment method.

In step 306, the financial institution may identify the service provider from the data in the preauthorization sent to the electronic payment method. In some aspects, the financial institution may identify the service provider based on the identifying information within the preauthorization and a service provider identification model that processes and compares the identifying information from the preauthorization to known service provider identifiers.

In step 307, the financial institution may determine that the preauthorization may be for a new service provider trial. In some aspects, the financial institution may use a model developed via machine learning to evaluate the preauthorization based on prior incoming charges from the same service provider to the same user or electronic payment method, and patterns of preauthorization and payments from the same service provider to other users within the financial institution, to determine that the user has enrolled in a new trial. In other aspects, the financial institution may scrape information via a browser extension that forwards information from web activity associated with the user to determine that the user has enrolled in a new trial.

In step 308, the financial institution may notify the user that a new trial has been detected. In some aspects, this notification may be generated by an application on a mobile device, where the application is a method by which the user accesses the electronic payment method. The mobile device may be similar to computing device 108. In other aspects, this notification may be sent by text, email, phone call, paper mail, or any other common method of contact, and electronic notifications received by any computing device similar to 101, 105, or 109 that can receive communications from network 103.

In step 309, the financial institution may provide the user with the option to have a reminder sent to the user before the trial ends. In some aspects, the financial institution may also provide the user with the option to enter the date on which the reminder will be sent. In other aspects, the financial institution may also provide the user with the option to block future charges from the service provider without waiting until near the end of the trial.

In step 310, similar to step 210 in FIG. 2, the financial institution may send a reminder to the user that the trial will end soon. In aspects in which the user provided the date for the reminder, the financial institution may send the reminder on the user-provided date. In other aspects, the financial institution may provide the user with the option to block charges from the service provider as part of the reminder, similar to step 220 in FIG. 2.

Figure 4:
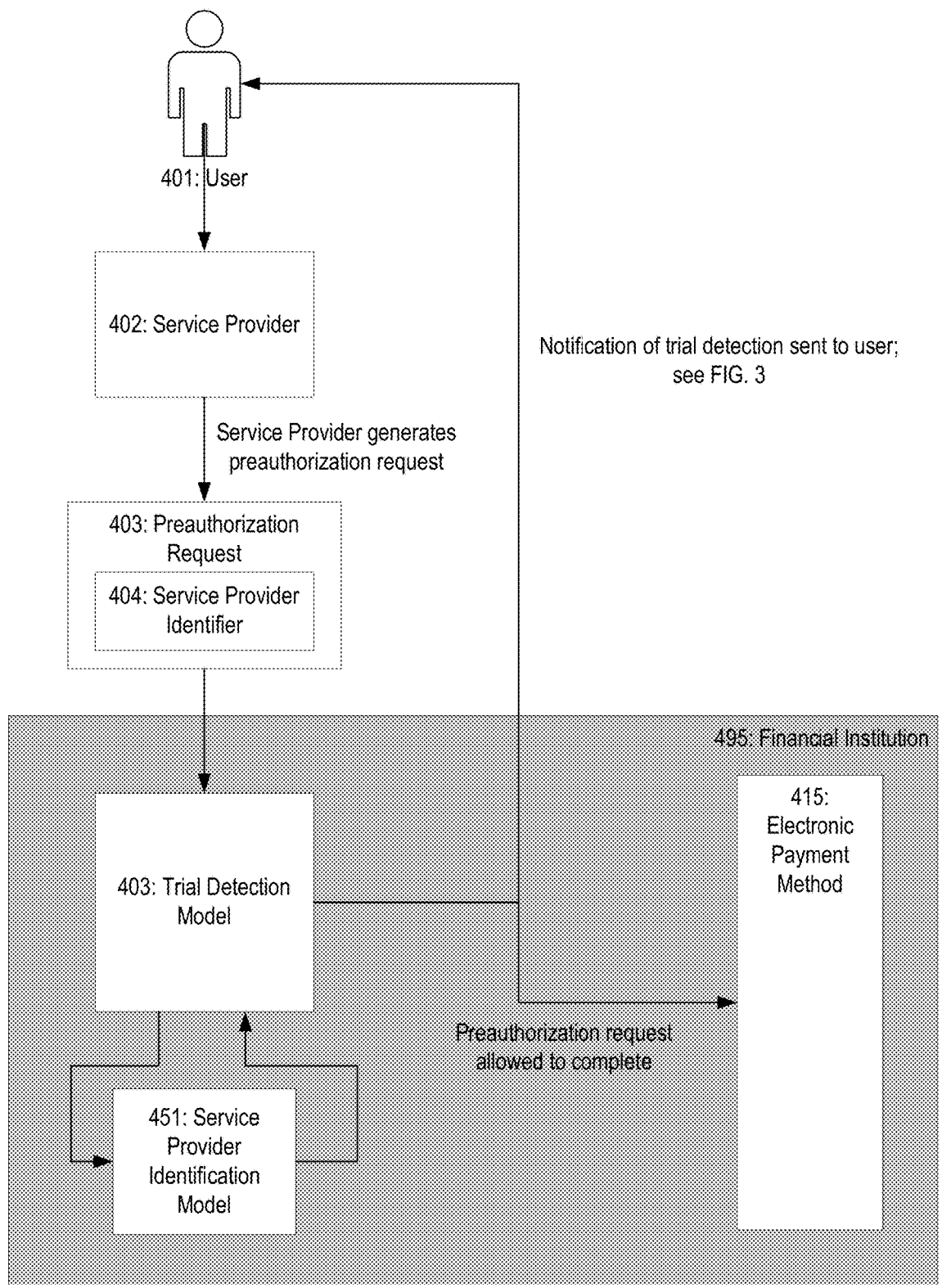
FIG. 4 depicts an illustrative flow chart of examples for the general method in FIG. 3, showing how a financial institution receives the preauthorization for the electronic payment method and provides the user with the ability to block charges according to aspects of the disclosure.

FIG. 4 illustrates aspects through which the financial institution may detect that the user has enrolled in a trial for a service provider service.

Outside of the financial institution 495, user 401 may enroll in a trial for a service provider service offered by service provider 402. At the time of enrollment, user 401 may provide electronic payment method 415 to be charged at the end of the trial. In these aspects, the trial may be free, and electronic payment method 415 may not be charged until the end of the trial period. In other aspects, the trial may have a reduced rate, and the electronic payment method 415 may be charged immediately at the reduced rate to begin the trial and charged a second time at the full or higher rate at the end of the trial.

In the aspects with the free trial, service provider 402 may send a preauthorization request 403 to financial institution 495, where the preauthorization request 403 is addressed to the electronic payment method 415. The preauthorization request 403 may be sent to confirm that electronic payment method 415 exists and is able to be charged. The financial institution 495 that maintains electronic payment 415 may receive the preauthorization request 403 from the service provider 402, similar to step 305 in FIG. 3.

The financial institution 495 may use the data within the incoming preauthorization request to both determine that the user 401 has enrolled in a trial and that service provider 402 is providing the trial. In some aspects, trial detection model 403 may evaluate the data from the preauthorization request 403, including, but not limited to, the service provider identifier 404 in the preauthorization request 403, the amount to be charged (for example, $0.00), and information indicating that the preauthorization is for a recurring charge, to determine that the user 401 has enrolled in a trial with service provider 402. In other aspects, trial detection model 403 may also evaluate information outside the preauthorization request, such as a lack of prior charges from service provider 402 to electronic payment method 415 or other electronic payment methods associated with user 401, predetermined lists of service providers known to provide trials, information about other users enrolling in trials, and more, to assist in determining that the user 401 has enrolled in a trial.

In some aspects, the financial institution 495 also may use the service provider identifier 404 in preauthorization request 403 to determine the identity of the service provider 402 that is providing the trial, via service provider identification model 451. The service provider identification model 451 may be similar to service provider identification model 751 discussed in FIG. 7 and will be described more thoroughly there.

After determining that the user 401 has enrolled in a trial and the identity of service provider 402 that is providing the trial, financial institution 495 may send a notification to user 401 informing the user that a new trial has been detected. In certain aspects, this notification may provide user 401 with the option to receive a notification of the upcoming payment before the trial ends. In other aspects, the notification may provide user 401 with the ability to block future charges from service provider 402.

Figure 5:
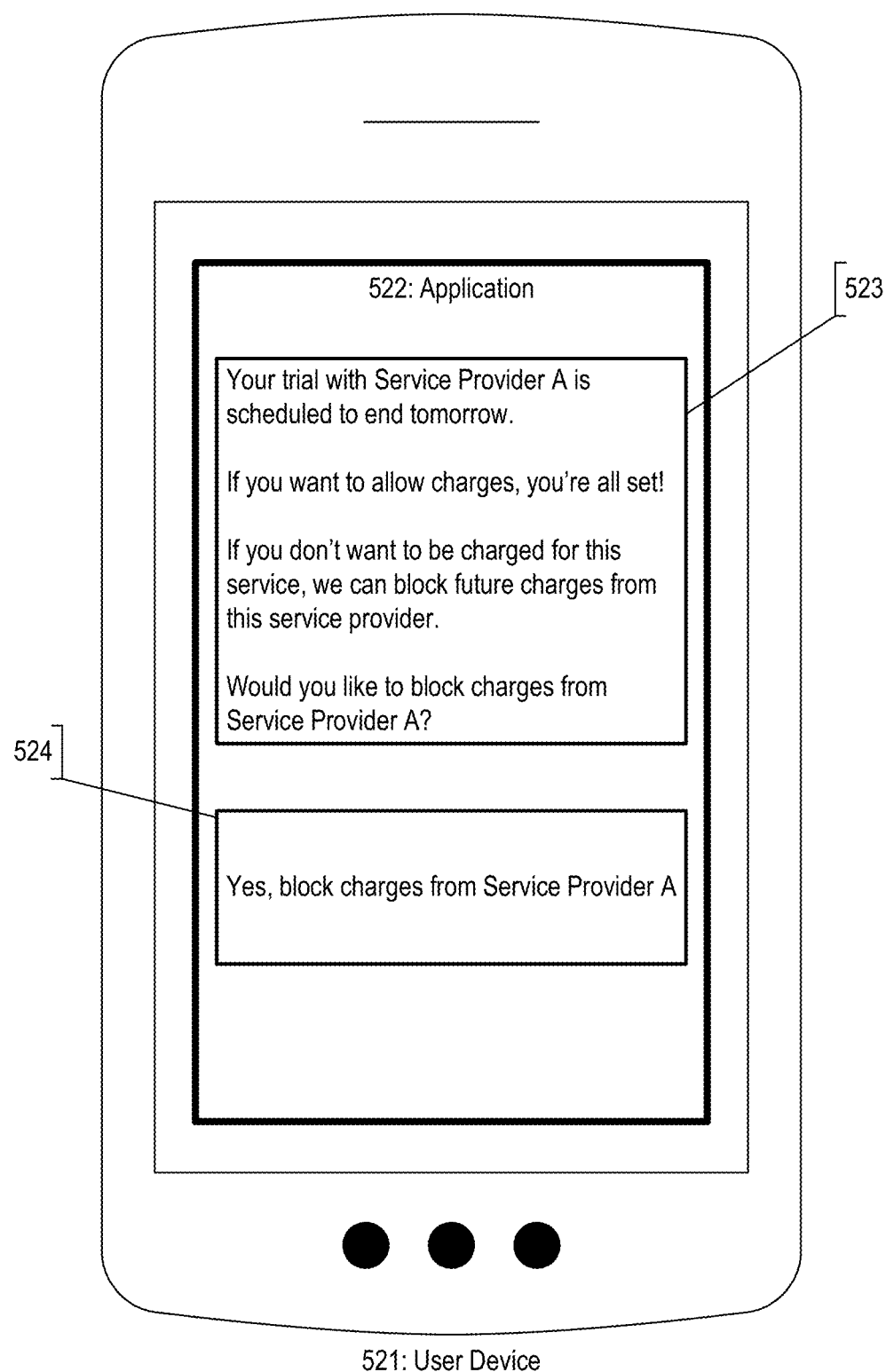
FIG. 5 depicts an example of a user device receiving a notification with the option to block charges to a service provider according to aspects of the disclosure.

FIG. 5 illustrates examples of how the financial institution may provide the option to block charges from the service provider to the user. In some aspects, the financial institution sends a notification to the user device 521. This notification may be generated from within an application 522 that the user accesses from user device 521. The user device 521 may be similar to computing device 108 from FIG. 1. However, in other aspects, the user device 521 may be similar to computing device 101, 107, or 109. The notification may include a message 523, explaining that the trial with the service provider will expire soon and that the electronic payment method may be soon charged for the service. The notification also may explain the options available to the user: for example, allowing future charges by doing nothing, or notifying the user of the ability to block charges.

In these aspects, the notification also may include an interactive element 524 to begin blocking charges from the service provider. In these aspects, interactive element 524 may be configured to send the API request to begin blocking charges once the user interacts with the element. In other aspects, interactive element 524 may include a link to a page from which the user can enable blocking.

In some aspects, user device 521 may display a confirmation message once the blocking request from interactive element 524 has been successfully processed by the financial institution. In other aspects, the financial institution may send a second notification to the user once the service provider has been blocked. For example, where message 523 is sent via text message to user device 521, the user may indicate that the user wishes to block charges by responding "YES" to message 523. In this example, the financial institution may send a second text message to user device 521 confirming that the service provider has been blocked.

Figure 6:
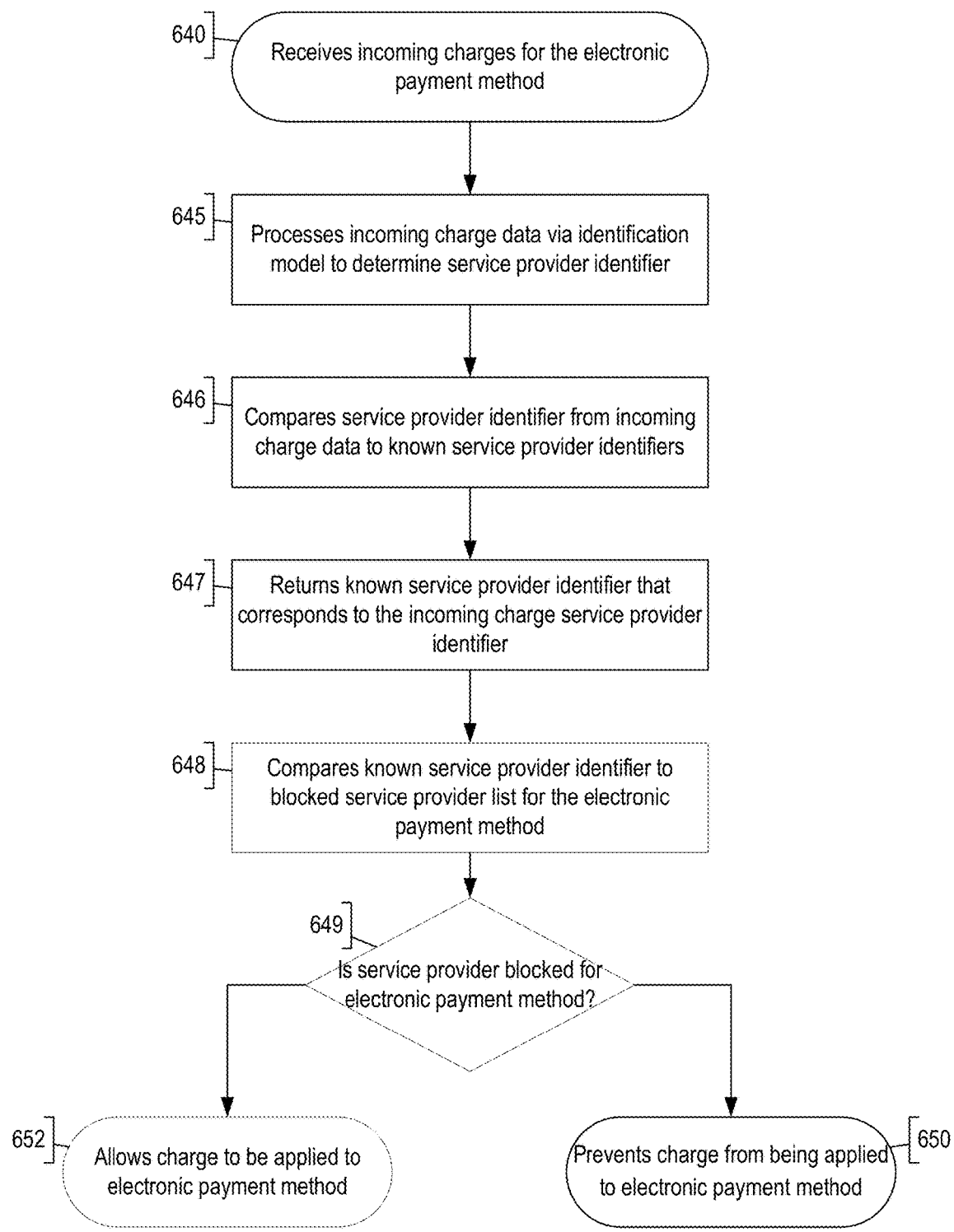
FIG. 6 is a flowchart representation showing the in-depth steps by which the financial institution receives incoming charges addressed to the electronic payment method, determines the service provider for each charge, and prevents the charge from applying to the electronic payment method if the merchant is blocked according to aspects of the disclosure.

FIG. 6 depicts a flowchart representation of how the financial institution may receive incoming charges to the electronic payment method, identify the service provider from the incoming charge data, and block charges for the blocked service provider.

In step 640, similar to step 240 in FIG. 2, the financial institution may receive incoming charges that are addressed to the electronic payment method. These incoming charges may be received over a network similar to network 103 and processed on computing devices similar to 101 and 105. In step 645, the service provider identification model may process the data from the incoming charge to determine the service provider identifier in the incoming charge. In some aspects, the incoming charge may be structured according to ISO 8583 and may be a 0100 message, containing at least, but not limited to, an originator, an account for withdrawal which identifies the electronic payment method, and the amount of the payment. The incoming charge data also may contain other information, such as a recurring charge flag, that may be used to help identify the incoming charge as being from the service provider. In some aspects, the recurring charge flag also may be used to identify the incoming charge as being for a recurring charge, rather than a one-off charge, and may be used to differentiate recurring charges for a service, which may be blocked, from one-off charges from the same service provider, which may be allowed.

In other aspects, the incoming charge may be sent via a third-party payment processor on behalf of the originating service provider, where the originating service provider may be the service provider providing the service for which the user is being charged. In these aspects, the incoming charge data may have data that identifies the third-party payment processor and data that identifies the originating service provider. In some aspects, the data that identifies the third-party payment processor and the data that identifies the originating service provider may be contained in the same field and must be parsed by the service provider identification model to separate out the original service provider.

The service provider identification model, similar to machine learning model 127 in FIG. 1, may use multiple methods to isolate the service provider identifier from the incoming charge data, including, but not limited to, regex processing, parsing of specific fields, lookup of service provider ID numbers, and more.

In step 646, the service provider identification model may compare the service provider identifier isolated from the incoming charge data to known service provider identifiers. The database of known service provider identifiers may be built based on incoming charge data from a plurality of charges, users, and service providers. In some aspects, the known service provider identifiers database may contain multiple potential matches to a single service provider to reflect different ways of identifying the same service provider within incoming charge data. In these aspects, the multiple potential service provider identifiers received in incoming charge data may map onto one single service provider identifier to be used to link other records back to that service provider. If a matching service provider identifier is found, the service provider identification model may return the known service provider identifier corresponding to the incoming charge service provider identifier in step 647.

If no matching service provider identifier is found in the known service provider identifiers database, the incoming charge may be applied to the electronic payment method without comparing the service provider identifier to the list of blocked service providers for the electronic payment method. A failure to find a match may trigger a second evaluation process to determine the reason that the service provider identification model failed to match the incoming service provider identifier to a known service provider. The second evaluation process may include, but is not limited to, a manual error checking process, adding a new mapping from the incoming service provider identifier to a known service provider in the database, creating a new known service provider to match the incoming service provider identifier, improving the service provider identification model to more accurately isolate the incoming service provider identifier, adjusting the threshold required to find a partial match, and more.

Once the incoming service provider identifier has been matched to a known service provider, the financial institution then may compare the known service provider identifier to the blocked list of service providers for the electronic payment method in step 648. If the known service provider identifier is found on the blocked service provider list, the financial institution may prevent the incoming charge from being applied to the electronic payment method in step 650, similar to step 250 in FIG. 2. In some aspects, the financial institution then may save the blocked charge with a flag indicating that it was blocked at the request of the user. In other aspects, the financial institution may return a value to the service provider indicating that the charge was declined.

Optionally, after blocking the charge, the financial institution may then send a notification to the user informing the user that a charge has been blocked at request of the user and identifying the service provider that was blocked. In some aspects, this notification may also provide the user with the option to enable the single charge or to enable all future charges from the service provider. In other aspects, this notification may also remind the user to follow up with the service provider directly to cancel the service that the electronic payment method is being charged for. This notification may be received on a user device, similar to user device 521 in FIG. 5 or computing device 108 in FIG. 1. If the known service provider identifier is not found on the blocked list, the financial institution may allow the charge to be applied to the electronic payment method in step 652.

Figure 7:
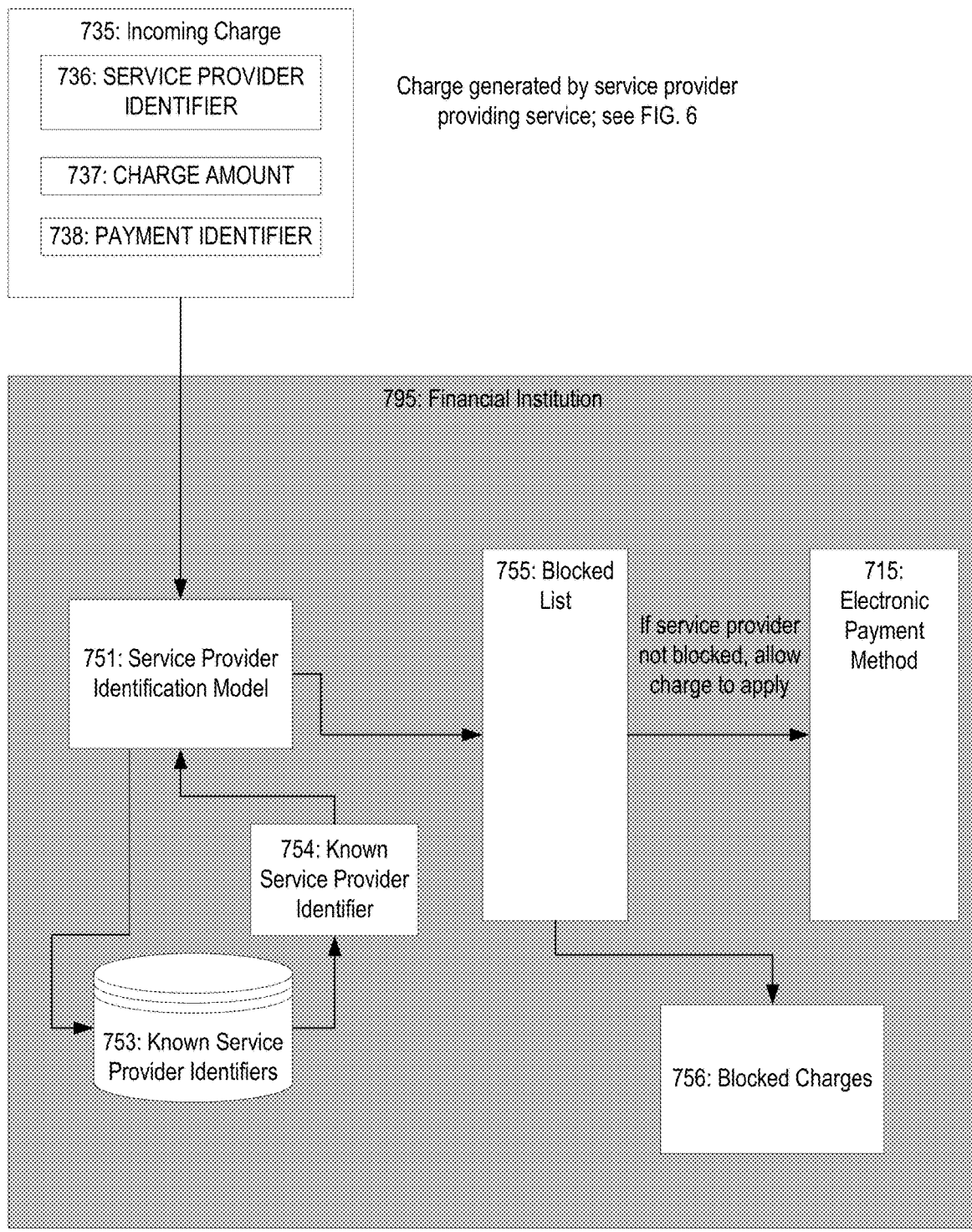
FIG. 7 depicts an illustrative flow chart for FIG. 6, with the financial institution receiving the incoming charges, identifying the service providers, and blocking charges from the blocked service provider according to aspects of the disclosure.

FIG. 7 illustrates examples of the movement of the incoming charge data 735 from the service provider to the financial institution 795, and how the incoming charge data 735 may be processed and forwarded to the electronic payment method 715.

Incoming charge data 735 may represent the incoming charge made by the service provider to electronic payment method 715 for the service which the user enrolled in a trial. The incoming charge data 735 may include a service provider identifier 736, the amount to be charged 737, and the electronic payment method identifier 738, representing the electronic payment method 715 that the user provided to the service provider for the trial. In certain aspects, the incoming charge data may be structured according to the ISO 8385 API. In other aspects, the incoming charge data may be structured according to any API accepted and processed by the financial institution 795 for electronic payment method 715.

The service provider identifier 736 may represent any and all data within the incoming charge data that may be used to identify the service provider, and may include, but is not limited to, the service provider name, a service provider ID number, free text information that contains both service provider-identifying information and other information, and more. In some aspects, incoming charge 735 may also include other data that may be used to more definitively identify the service provider in combination with service provider identifier 736. In other aspects, where the incoming charge is coming from a third-party payment processor on behalf of the originating service provider, incoming charge 735 may also include identifying information for the payment processor. In other aspects, where the user only blocks charges for one service offered by the service provider while allowing other charges from the service provider, incoming charge 735 may include data that identifies whether the charge is for the blocked service.

The incoming charge data 735, upon being received by financial institution 795, may be processed in service provider identification model 751. Service provider identification model 751, which may be similar to machine learning model 127 from FIG. 1, may extract the service provider identifier 736 from incoming charge 735 and clean service provider identifier 736 through tools such as, but not limited to, regex matching, which removes extraneous characters.

The service provider identification model 751 may then compare the cleaned service provider identifier 736 to known service provider identifiers in the known service provider identifier database 753. The service provider identification model may use different thresholds to determine a "match" in the known service provider identifiers database 753. In some aspects, the service provider identification model 751 may require an exact match of the service provider identifier 736 and a known service provider identifier in the known service provider identifiers database 753. In other aspects, the service provider identification model 751 may require only a partial match, requiring the service provider identifier 736 to meet a specific threshold of similarity to a known service provider identifier to consider the known service provider identifier a match. In still other aspects, the service provider identification model 751 may utilize both exact and partial matches and return the best match available, whether an exact or partial match. For example, if the service provider identifier 736 was "AMAZON*PRIME" and the known service provider identifiers database 753 included an entry for "AMAZON*PRIME", the service provider identification model 751 may return the exact match for "AMAZON*PRIME". However, if the known service provider identifiers database 753 did not include "AMAZON*PRIME", but did include "AMAZON", the service provider identification model 751 may return "AMAZON" as the partial match.

In certain aspects where known service provider identifiers database 753 was structured as a many to one database, where multiple potential service provider identifiers were mapped to a single service provider record, "AMAZON*PRIME" and "AMAZON" may both map to the same service provider record, "AMAZON".

In aspects where users may block one service from the service provider while allowing other charges from that service provider, the known service provider identifiers database 753 may include different entries for both services and the service provider that offers the service. In some instances, "AMAZON*PRIME" and "AMAZON" may be separate entries within the known service provider identifiers database 753. In some aspects, the service provider identification model 751 may be configured to require a higher degree of similarity to match the service provider identifier 736 to a known service provider identifier. In this instance, "AMAZON*PRIME" may match to "AMAZON*PRIME", but not "AMAZON".

If no matching known service provider identifier is found, financial institution 795 may provide optional workflows to handle unknown service provider identifiers. These workflows may include manual error handling, adjustment of the threshold for partial matches, creation of new known service provider identifiers, and more. In some aspects, the financial institution may only attempt to find matching known service provider identifiers for a predetermined list of known service providers, allowing incoming charges with service provider identifiers that do not match the predetermined list to be applied to the electronic payment method 715 without further analysis.

Once the known service provider identifier 754 that matches the incoming charge service provider identifier 736 has been found, the financial institution 795 then compares the known service provider identifier 754 to the blocked service provider list 755 that is associated with electronic payment method 715. If the blocked service provider list 755 does not contain known service provider identifier 754, the financial institution 795 may allow the charge to be applied to electronic payment method 715. If the blocked service provider list 755 does contain the known service provider identifier 754, the financial institution may prevent the incoming charge 735 from being applied to electronic payment method 715. In some aspects, as illustrated in FIG. 7, the financial institution may save the blocked charge with a flag indicating that it was blocked at the request of the user in, for example, a list or database of blocked charges 756.

In other aspects, the user may view blocked charges from the list of blocked charges 756 at a later date from the user account; in some aspects, the user then may manually allow a charge to be applied to the electronic payment method 715. In other aspects, one financial account may be shared by multiple users, each user having the ability to access the account. In these aspects, one user may be able to add a service provider to blocked service provider list 755 without blocking that service provider for the other users on the account.

Figure 8:
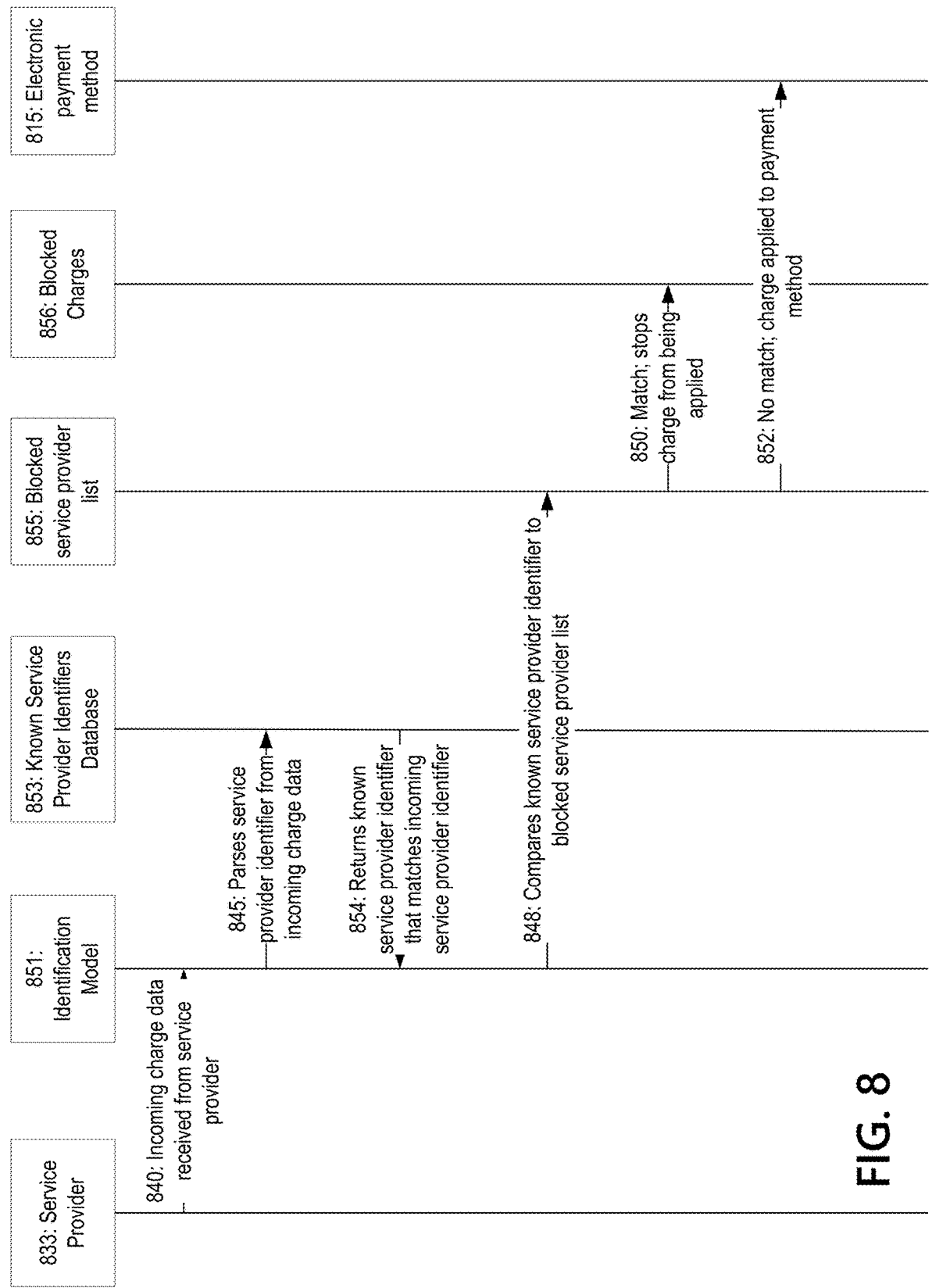
FIG. 8 is an illustrative flowchart representation of the movement of the incoming charge data, from receiving the incoming charge, determining the service provider identifier via the service provider identification model, comparing the service provider identifier to known service provider identifiers, confirming that the service provider is blocked for the electronic payment method, and blocking the charge to the electronic payment method according to aspects of the disclosure.

FIG. 8 depicts the data flow of the incoming charge data from FIGS. 6 and 7, from receiving the incoming charge in step 840 from the service provider 833 to blocking the charge in step 850 from being applied to the electronic payment method 815.

In step 845, service provider identification model 851, a machine learning model similar to machine learning model 127 in FIG. 1, may parse the incoming charge data to isolate the service provider identifier. This parsing may be necessary because service provider identifiers may not be consistent across multiple charges. Instead, the service provider may use different identifiers on charges for different services, different accounts, or may send unique identifiers sent on every charge. Service providers also may rebrand and change the identifier sent on the charge, even if the charge was for a recurring service that the user was enrolled in prior to the rebranding. The service provider also may be acquired by another company and change the name of the service or modifying the identifier to reflect the change in ownership. The service provider also may generate charges from a third party or a third-party payment processor; in these cases, the third party may put identifiers that identify the third party on the charge, rather than solely an identifier which identifies the original service provider. All of these reasons, and others not listed, may make it difficult to identify the service provider from incoming charge data.

In aspects where charges are formatted according to ISO 8583, while the service provider identifier may be in the same field in the charge every time, there may not be any standardization around the format of the service provider identifier or which field it may be in. In aspects where the charge is generated by a third party on behalf of the service provider, the service provider identifier may be in a different field and format compared to if the service provider had generated the charge independently. In aspects with different APIs, there may be more standardization regarding the format of the identifier, the location of the identifier in the charge, and the consistency of the identifier. However, even in these aspects, a financial institution may still have to process charges formatted according to different APIs and may then need to have a way to isolate and compare service provider identifiers from different APIs.

The service provider identification model 851 then may compare the parsed service provider identifier from the incoming charge data to known service provider identifiers in the known service provider identifiers database 853. A similar workflow is described in FIG. 6.

The known identifiers database 853 may be stored on a database structure similar to computing device 105 in FIG. 1. The known service provider identifiers database 853 may be structured like a many-to-one database, where many incoming service provider identifiers may be matched to one known service provider identifier. In some aspects, the single known service provider identifier may be an internal ID used within the financial institution for matching and service provider lookups. In other aspects, the known service provider identifiers database may be structured differently while still allowing lookup and matching to a known service provider identifier. The known service provider identifiers database may also be stored on a computing device similar to devices 101 or 105 from FIG. 1 and accessed via a network similar to network 103.

If a matching service provider identifier is not found in the known service provider identifiers database, the financial institution may allow the incoming charge to be applied to electronic payment method 815. In other aspects, the financial institution may also have secondary workflows to address unknown incoming service provider identifiers. These workflows may include manual error review, adjusting the threshold required to find a match, adding new known service provider identifiers to the known service provider identifiers database 853, or more. In other aspects, the financial institution may prevent the incoming charge from being applied to the electronic payment method 815 until the service provider can be identified. According to some aspects, when a service provider identifier does not match a known service provider identifier, the result may be logged into a database. For example, the information from every transaction may be logged into a data warehouse and use at a later data to retrain at least one machine-learning model.

If a matching known service provider identifier is found, the known service provider identifiers database 853 may return the matching known service provider identifier in step 854 to the identification model 851. The known service provider identifier then may be, in step 848, compared to the service provider identifiers on the blocked service provider list 855. The blocked service provider list 855 may be similar to the blocked service provider list 755 in FIG. 7.

If the known service provider identifier matches a service provider identifier on the blocked list 855, the incoming charge may be prevented from being applied to the electronic payment method 815 in step 850. If the known service provider identifier is not found on the blocked list 855, the incoming charge may be applied to electronic payment method 815 in step 852. A similar process is described in FIG. 6.

Figure 9:
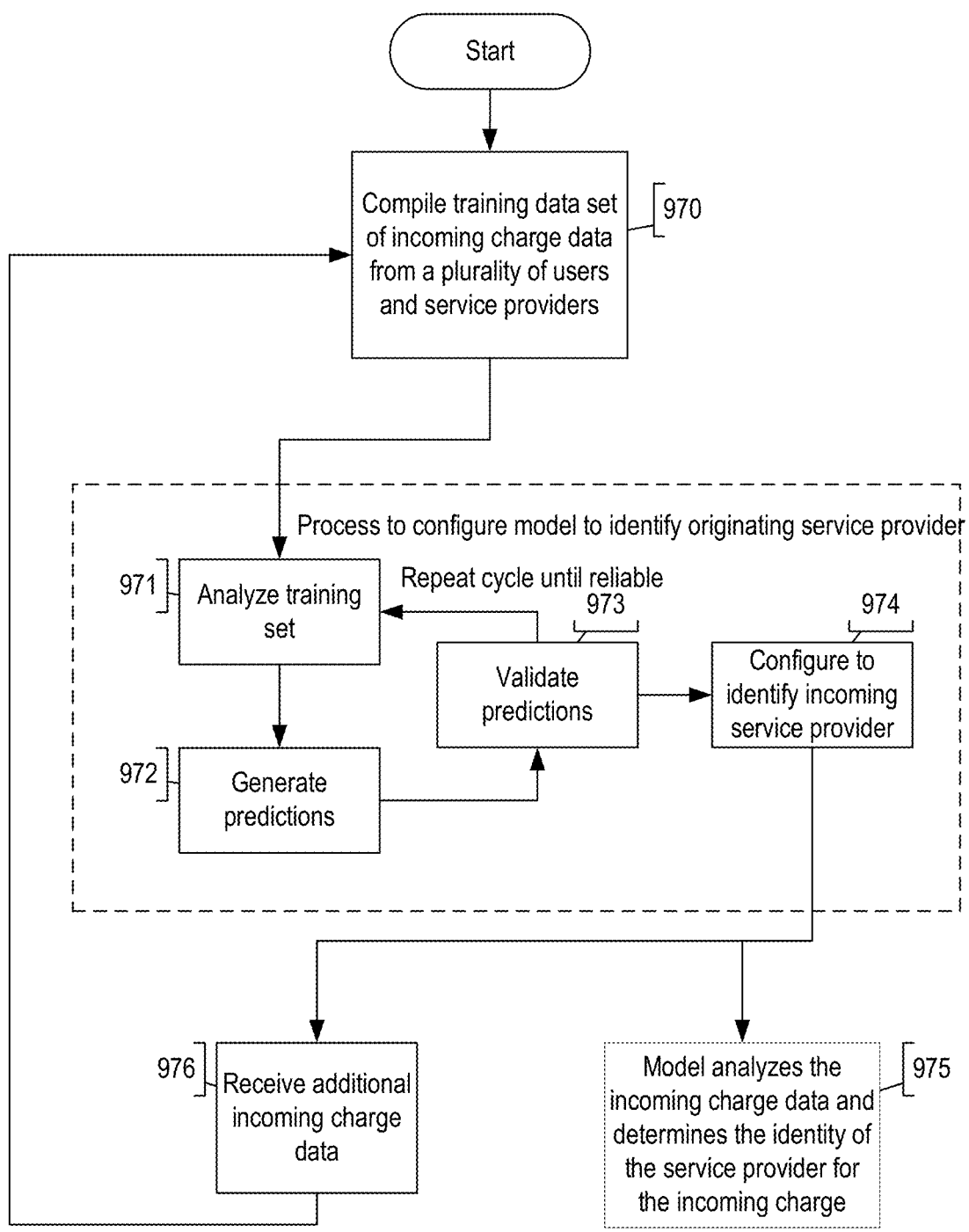
FIG. 9 is an illustrative flowchart representation of the process for training the service provider identification model according to aspects of the disclosure.

FIG. 9 depicts an illustrative configuration process that, for the service provider identification model 851, may analyze incoming charge data, isolate the service provider identifier from the incoming charge data, and match the service provider identifier to known service providers.

First, a training set may be compiled in step 970. The training set, similar to the training set 129 in FIG. 1, may be based on incoming charge data from a plurality of service providers and users. The training set may also be compiled based on data obtained through other mechanisms, such as service provider-provided information about how charges from those service providers will be structured, industry standards for incoming charge data, and other methods.

The service provider identification model 851, similar to the machine learning model 127 in FIG. 1, may analyze the training set in step 971 and generate predictions in step 972. These predictions may be validated against the known identifiers of the service providers within the training set in step 973. The service provider identification model 851 then may incorporate the validations and improve the model by cycling through the analysis, prediction, and validation process until the model is configured for real-time service provider identification in step 974.

After being configured for use, in step 974, the service provider identification model 851 may analyze incoming charge data and determine the identity of the service provider in step 975. At this point, the service provider identification model may be used as described previously in FIGS. 2-8.

Also, after step 974, the machine-learning model may be updated over time with new training sets in step 976. In this step, the model may receive new sets of data and iterate through the process previously described in steps 970 through 974. These new sets of data may include additional sets of incoming charges, service provider categorizations, information for distinguishing multiple services or charges from the same service provider, and more. These training sets may be obtained from third parties or compiled based on a plurality of incoming charge data as previously described in step 970. After completing the training steps 971 through 974, the service provider identification model 851 may again be used for identifying the service provider records from incoming charge data as previously described in step 975.

It will be appreciated that many of the above aspects also may be applicable to a scenario in which it is detected that a user is currently signed up for a service provider service that has a recurring payment and in which a trial has been completed or there was no trial. In these cases, a method may comprise determining, based on use of an electronic payment method by a user, that the user has signed up for a service of a service provider and provided the electronic payment method to be charged, providing the user with an option to block charges from the service provider, and blocking an incoming charge from the service provider to the user based on the user requesting charges to be blocked. Blocking an incoming charge may comprise storing, for the electronic payment method, the service provider on a blocked list, and receiving, at a financial institution, an incoming charge addressed to the electronic payment method. Blocking the incoming charge may further comprise determining, by a machine learning model and based on incoming charge data, that the incoming charge is most likely from the blocked service provider, wherein the machine learning model may be configured to identify the service provider sending the incoming charge based on the incoming charge data, and preventing the incoming charge from the blocked service provider from being applied to the electronic payment method.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

These features or claims may also be embodied in alternative ways. In some aspects, the known service provider identifiers database may be maintained by a third party on behalf of multiple financial institutions. In other aspects, the service provider may exchange identification protocols with the financial institution and agree to standardized identification protocols between the service provider and the financial institution.

The invention claimed is:

1. A computer implemented method comprising:
   receiving, at a server, a pre-authorization request for an electronic payment method associated with a user;
   determining, based on the pre-authorization request, that the user has signed up for a trial of a service associated with an entity, wherein determining that the user has signed up for the trial comprises:
   identifying, by a machine learning model and based on the pre-authorization request, the entity, and
   determining, by the machine learning model and based on the pre-authorization request and the entity, that the pre-authorization request is for a trial;
   sending, from the server and to a mobile device associated with the user, a notification indicating that a trial has been detected based on the pre-authorization request for the electronic payment method;
   predicting, by the machine learning model and based on prior pre-authorization requests from the entity and prior incoming charges from the entity, a trial duration;
   sending, prior to expiration of the trial duration and from the server and to the mobile device, an option to block charges from the entity to the electronic payment method;
   receiving, from the mobile device and at the server, an indication to block charges from the entity; and
   based on the indication to block charges, blocking an incoming charge from the entity to the electronic payment method, wherein blocking the incoming charge comprises:
   storing, for the electronic payment method and on the server, the entity on a blocked list associated with the electronic payment method,
   receiving, at the server, the incoming charge,
   determining, by the machine learning model and based on prior incoming charges from the entity, that the incoming charge is from the entity, and
   based on the determination that the incoming charges is from the entity, preventing the incoming charge from the entity from being applied to the electronic payment method.

2. The method of claim 1, further comprising training the machine learning model to identify the entity from incoming charge data by steps comprising:
   collecting, from a plurality of users and a plurality of electronic payment methods, a plurality of past incoming charges;
   identifying, from a second incoming charge in the plurality of incoming charges, one or more identifiers indicating a second entity;
   comparing the one or more identifiers to one or more known entity identifiers; and,
   determining, based on the one or more identifiers, that the second incoming charge is from a known entity.

3. The method of claim 1, wherein the incoming charge comprises an entity identifier, and wherein
identifying the entity associated with the incoming charge comprises comparing the entity identifier to known entity identifiers.

4. The method of claim 3, wherein the incoming charge comprises an entity ID number field, comprising numeric characters, and wherein
identifying the entity associated with the incoming charge further comprises matching an entity ID number from the entity ID number field of the incoming charge to known entity ID numbers.

5. The method of claim 1, wherein the incoming charge comprises a recurring charge indicator, and
wherein determining that the incoming charge is a payment for the service is further based on the recurring charge indicator.

6. The method of claim 1, wherein the electronic payment method is a credit card.

7. The method of claim 1, wherein the trial is for a subscription service and the electronic payment method receives recurring incoming charges for the subscription service.

8. The method of claim 1, wherein blocking the incoming charge for the service further comprises blocking future charges for the service.

9. The method of claim 1, wherein blocking charges further comprises
blocking charges associated with the service that the machine learning model determined that the user signed up for, and
allowing other charges from the entity providing the service.

10. The method of claim 1, wherein sending the option to block charges from the entity further comprises:
sending, from the server and to the mobile device, an option to block future charges to the electronic payment method from the entity.

11. The method of claim 1, wherein blocking the incoming charge further comprises
storing the blocked incoming charge with a code to identify the incoming charge as blocked based on a user request.

12. The method of claim 1, further comprising
notifying, via the mobile device and based on blocking the incoming charge, the user that the incoming charge was received from the entity to the electronic payment method.

13. The method of claim 11, wherein notifying the user that the incoming charge from the entity was blocked further comprises
prompting, via the mobile device, the user to allow charges from the entity.

14. The method of claim 1, wherein determining that the user has signed up for the trial further comprises:
receiving, at the server and from the entity, a notification that the user has signed up for the trial using the electronic payment method.

15. The method of claim 1, wherein receiving the incoming charge further comprises:
receiving, at the server and from an intermediary on behalf of the entity, the incoming charges.

16. The method of claim 1, wherein storing, for the electronic payment method, the entity on the blocked list comprises:
receiving, at the server and via the mobile device and from the user, the blocked list, and
sending, from the server and to the mobile device based on expiration of the trial duration, the option to block payments to the entity.

17. The method of claim 1, wherein the electronic payment method is maintained by a financial institution, and
wherein blocking charges from the entity further comprises preventing the incoming charge from the entity from being applied to other electronic payment methods associated with the user that are maintained by the financial institution.

18. A computing device, comprising:
one or more processors; and
memory storing instructions that, when executed by the one or more processors, cause the computing device to:
receive, at a server, a pre-authorization request for an electronic payment method associated with a user;
determine, based on the pre-authorization request, that the user has signed up for a trial of a service associated with an entity, wherein determining that the user has signed up for the trial comprises:
identifying, by a machine learning model and based on the pre-authorization request, the entity, and
determining, by the machine learning model and based on the pre-authorization request and the entity, that the pre-authorization request is for a trial;
send, from the server and to a mobile device associated with the user, a notification indicating that a trial has been detected based on the pre-authorization request for the electronic payment method;
predict, by the machine learning model and based on prior pre-preauthorization requests from the entity and prior incoming charges from the entity, a trial duration for the trial;
send, prior to expiration of the trial duration and from the server and to the mobile device, an option to block charges from the entity to the electronic payment method;
receive, from the mobile device and at the server, an indication to block charges from the entity; and
based on the indication to block charges, block an incoming charge from the entity to the electronic payment method, wherein blocking charges comprises:
storing, for the electronic payment method and on the server, the entity on a blocked list associated with the electronic payment method,
receiving, at the server, the incoming charge,
determining, by the machine learning model and based on prior incoming charges from the entity, that the received incoming charge is from the entity, and
based on the determination that the incoming charges is from the entity, preventing the incoming charge from the entity from being applied to the electronic payment method.

19. The computing device of claim 18, wherein identifying the entity by the machine learning model further comprises:
collecting, from a plurality of users and a plurality of electronic payment methods, a plurality of past incoming charges;
identifying, from a second incoming charge in the plurality of incoming charges, one or more identifiers indicating a second entity;
comparing the one or more identifiers to one or more known entity identifiers; and, determining, based on the one or more identifiers, that the second incoming charge is from a known entity.

20. One or more non-transitory computer-readable media storing instructions that, when executed by one or more processors, cause a computing device to perform steps comprising:
  receiving, at a server, a pre-authorization request for an electronic payment method associated with a user;
  determining, based on the pre-authorization request, that the user has signed up for a trial of a service associated with an entity, wherein determining that the user has signed up for a trial comprises:
    identifying, by a machine learning model and based on the pre-authorization request, the entity, and
    determining, by the machine learning model and based on the pre-authorization request and the entity, that the pre-authorization request is for a trial;
  sending, from the server and to a mobile device associated with the user, a notification indicating that a trial has been detected based on the pre-authorization request for the electronic payment method;
  predicting, by the machine learning model and based on past pre-authorization requests from the entity and past incoming charges from the entity, a trial duration;
  sending, prior to expiration of the trial duration and from the server and to the mobile device, an option to block charges from the entity to the electronic payment method;
  receiving, from the mobile device and at the server, an indication to block charges from the entity; and
  based on the indication to block charges, blocking an incoming charge from the entity to the electronic payment method, wherein blocking the incoming charge comprises:
    storing, for the electronic payment method and on the server, the entity on a blocked list associated with the electronic payment method,
    receiving the incoming charge,
    determining, by the machine learning model and based on prior incoming charges from the entity, that the received incoming charge is from the entity, and
    based on the determination that the incoming charges is from the entity, preventing the incoming charge from the entity from being applied to the electronic payment method.

\* \* \* \* \*